United States Patent [19]

Buxton et al.

[11] Patent Number: 4,959,661
[45] Date of Patent: Sep. 25, 1990

[54] INK-JET PRINTING PROCESS

[75] Inventors: Galina P. Buxton, Tenafly; Harshad M. Shah, Fairlawn, both of N.J.

[73] Assignee: Olin Hunt Specialty Products Inc., Cheshire, Conn.

[21] Appl. No.: 413,898

[22] Filed: Sep. 28, 1989

[51] Int. Cl.$^5$ .......................... B41J 2/01; C09D 11/00
[52] U.S. Cl. ................................ 346/1.1; 346/140 R; 106/23
[58] Field of Search ............... 346/1.1, 140 R; 106/23

[56] References Cited

U.S. PATENT DOCUMENTS

| | | |
|---|---|---|
| 3,705,043 | 12/1972 | Zabiak . |
| 4,246,154 | 6/1989 | Yao . |
| 4,724,005 | 2/1988 | Minten et al. . |
| 4,735,657 | 4/1988 | Baxter et al. ............... 106/23 X |
| 4,810,292 | 3/1989 | Palmer et al. ............... 106/23 |
| 4,836,852 | 6/1989 | Knirsch et al. ............... 106/23 X |
| 4,853,036 | 8/1989 | Koike et al. ............... 106/23 X |
| 4,877,451 | 10/1989 | Winnik et al. ............... 106/23 |

OTHER PUBLICATIONS

P. L. Gendler and A. H. Sporer, "Membrane Ink Technology", Advance Printing of Paper Summaries, pp. 139-142.
Wong, et al., "Sterically Stabilized Polymer Colloids & Their Use as Ink-Jet Inks", Journal of Imaging Technology, vol. 14, No. 5, Oct. 1988.
S. J. Bares, "Ink-Jet: The Day of Plain Paper Has Arrived", North American Hard Copy Supplies Conference, May 18-20, 1988.
M. D. Croucher, "The Use of Surfactants in Liquid Developers for Electronic Printing", Surfactants in Emerging Techologies (1987).
M. D. Croucher and M. L. Hair, "Design Criteria and Future Direction in Ink-Jet Ink Technology" (1988).
J. F. Oliver, "Ink/Paper Interactions in Ink Jet Printing (IJP)", Surface and Colloid Science in Computer Technology, pp. 409-428.
C. T. Ashley, et al., "Development and Characterization of Ink for An Electrostatic Ink Jet Printer", Jet Printer Ink, Jan., 1977 (pp. 69-74).

*Primary Examiner*—George H. Miller, Jr.
*Attorney, Agent, or Firm*—William A. Simons

[57] ABSTRACT

A process for applying an ink-jet printing ink comprising the steps of:
(a) preparing an aqueous Newtonian dispersion containing acidic or neutral carbon black or pigments and a surfactant;
(b) removing all aggregates larger than 5 microns; and
(c) ink-jet printing said dispersion onto a receptor substrate.

13 Claims, No Drawings

INK-JET PRINTING PROCESS

This invention relates to an ink-jet printing process. In particular, this invention relates to a carbon black-containing ink-jet printing process for printing on plain paper.

Ink-jet printing is a well-known technique by which printing is effected without contact between the printing device and the substrate on which the printed characters are deposited Briefly described, ink-jet printing involves the technique of projecting a continuous or intermittent stream of droplets of ink to a surface and controlling the direction of the stream electronically so that the droplets are caused to form the desired printed image on the substrate.

This printing technique has many industrial applications, such as the printing of characters onto irregularly-shaped surfaces, as well as applications in the personal computer, word processor, and engineering environments which require printing versatility.

There are two major types of ink-jet printing systems: Continuous and Drop-on-Demand, though there are many variations and hybrids of each.

The continuous method employs an electrostatic field between the printhead and the receptor substrate to direct the flight of ink droplets. Generally, this method pumps a liquid ink from a reservoir to a printhead having a microscopic nozzle, thus creating a continuous stream of ink droplets This stream or jet of ink droplets then pass through an electrostatic field created by a pair of electrostatic changing plates. The now charged droplets are passed through a second electrostatic field created by a pair of plates where the charged ink droplets are then either directed (or deflected) to the receptor substrate to be printed or not directed (or indeflected) to an ink recycle means for reuse.

The Drop-on-Demand generally employs a piezoelectric transducer nozzle to expel ink droplets from the nozzle to the receptor substrate only as needed. The droplets are expelled from the nozzle by an internal change in the nozzle pressure caused by the piezoelectric transducer. Alternatively, a hot resistor may be used instead of the piezoelectric transducer. The hot resistor raPidly vaporizes a solvent which causes the ejection of ink droplets through a nozzle. No ink recirculation is need in this system.

In general, ink jet printing techniques impose rigid requirements on the ink compositions. To be suitable for use as an ink-jet ink, the compositions must meet rigid requirements of viscosity and resistivity, solubility, compatibility of components, and wettability of substrate; the ink must be quick-drying and smear resistant, must be capable of passing through the ink-jet nozzle without clogging and must permit rapid clean-up of the machine components with minimum effort.

The use of aqueous-based inks for ink-jet printers is well-known. See U.S. Pat. No. 4,761,180, which issued to Askeland, et al. on Aug. 2, 1988.

The present generation of ink-jet inks are usually composed of a dye dissolved in a water-based fluid. See, for example, Ashley, C. T., et al. IBM, J. Res. Develop. 21, 69 (1977). Additives such as biocides, chelating agents, humectants, and buffers are also used as additives The most serious drawback of this type of ink is the feathering of the dyed fluid along the paper fibers with a concomitant degradation in image quality. Note Oliver, J., in Surface and Colloid Science in Computer Technology, K. Mittal. Ed. Plenum Press, NY, 1987, pp. 409-428. A second problem with the dyed fluid is that since the dye must be soluble (at least partially) in water, the inks are not waterfast on paper.

Still another persistent problem associated with currently available aqueous-based inks is their propensity to crust over a period of time, eventually leading to plugging of the nozzle or orifice in the printhead from which droplets of ink are expelled in the printing operation. Crusting is the crystallization of the ink around the nozzle of the printhead, causing partial or full blockage of the orifice, leading to misdirection of the droplet (partial blockage) or prevention of drop ejection (full blockage). The crusting arises from the precipitation of dye salts in the nozzle.

To overcome these limitations, various groups have suggested the use of particulate materials such as carbon blacks and colored organic pigments as waterfast, non-feathering colorants for ink-jet inks See, for example, Jap. Patents JA 56:147,682 to JA 56:147,871 assigned to Canon. The problem with these materials comes in making dispersions that have a particle size such that they will not settle and clog the fluidic circuit of the printer. Colloidal stability is also a concern since such materials are metastable (i.e., can be kinetically stable but thermodynamically unstable). In U.S. Pat. No. 4,246,154 (Yao), this problem was partially solved by preparing emulsion-polymerized, submicron-size polymer particles dispersed in water. Others have used in situ particle polymerization process to prepare sterically stabilized polymer particles and then solubilized oil-soluble dye into those particles. Note Lok, K., et al., ACS Polymeric Materials Science and Engineering Preprints, 52, pp. 313-319, (1985).

Numerous patents have also issued for pigment-based ink-jet inks. However, it is still very difficult to obtain a dispersion with particles which are small enough (<1,000 angstroms) and yet will not settle. Reliability is also a major issue as the orifice must be opened at all times and, therefore, it cannot become clogged with ink-jet materials.

The concentration of particles used in the ink is also important; and, an upper limit is imposed by the viscosity of the ink that is required for the particular printer employed in order to prevent clogging of printhead's orifices. Although this limitation was found by Zabiak, D. M., U.S. Pat. No. 3,705,043, issued Dec. 5, 1972, to be lower than 1% for carbon black dispersions, the present invention is able to use up to 5% by weight carbon black or pigment.

Accordingly, there is still a need for an ink-jet printing ink which possesses all of the above-listed desired properties of an ink-jet, in particularly good waterfastness, the absence of crusting, and having the ability to make fine dot images on regular plain paper.

The present invention is a solution to that need. The particulate ink-jet dispersion used in the process of the present invention is not toxic and forms a water-fast non-spreading sharp image on regular or plain paper When a drop of this dispersion contacts paper during printing, the water spreads into the paper fiber, causing the carbon black or pigment particles in the ink to be driven close together and close to the paper fibers. As a result, a waterfast sharp image is formed. Moreover, since no dyes need be present in this particular composition, crusting is not a problem.

Accordingly, the present invention is directed to a process for applying an ink-jet printing ink comprising of the steps of:

(a) preparing an aqueous Newtonian dispersion containing from:
  (1) about 0.1% to about 5.0% by weight, based on the weight of the dispersion of particulate materials selected from the group consisting of an acidic or neutral carbon black, pigment and combinations thereof, said particulate material having an average particle size of less than about 3.0 microns in said dispersion;
  (2) said dispersion having a surface tension of greater than 35 $mNm^{-1}$ and a viscosity in the range of about 1 to 10 $ms/m^2$.
(b) removing all agglomerates larger than 5 microns from said dispersion; and
(c) ink-jet printing said agglomerate-free carbon black dispersion onto a receptor substrate.

In preparing this liquid dispersion, the above-noted critical ingredients and any other preferred ingredients are thoroughly mixed together to form a stable dispersion. This may be accomplished by subjecting a concentrated form of the dispersion to ball milling, colloidal milling, high-shear milling, or ultrasonic mixing techniques. The thoroughly mixed dispersion is later diluted with more water while agitating to obtain the desired concentration for the ink-jet. The preferred method of mixing is ball milling a concentrated form of the dispersion in an attritor or other composition container having metal, glass, mineral or plastic beads therein for a period of about 1 to about 24 hours. This thorough mixing allows for the carbon black particles to be intimately coated or wetted with the surfactant. This mixed concentrate is then mixed with more water and other additives to the desired concentration The ink is preferably kept agitated during both the mixing and diluting steps to aid in keeping the dispersion stable.

As stated above, the carbon black or pigment particles should have an average particle diameter below about 3 microns while in the dispersion. It is desirable to have this average particle diameter as small as possible to obtain the more stable dispersion as possible. As mentioned above, stability is a major requirement of particulate ink-jet inks; the colloidal particles should remain as discrete entities over the lifetime of the ink. It is preferred that the carbon black or pigment particles have an average particle diameter from about 0.01 to about 3.0, more preferably from 0.01 and about 2.0 microns when in said dispersion. A centrifuge operation is employed to attain smaller particle sizes and narrower distribution. The term "average particle diameter" as employed herein in both the specification and claims refers to average means diameter of the particles (the average by number) The average mean diameter in the dispersion may be determined through the use of either a NiComp Model 270 Submicron Particle Sizer or a HIAC PA-720 Automatic Particle Size Analyzer (both available from the HIAC/ROYCO Instrument Division of Pacific Scientific of Menlo Park, Calif.).

Any kind of readily dispersible pigments may be used for this invention It is preferred to utilize pigments having small particle sizes These preferred organic pigments are Irgazin Yellow (Ciba-Geigy), Red 4RF (Sandoz Chemicals), Heliogen Blue, Lithol Rubin, and Sico Fast Yellow (all of BASF).

It is preferred to use deionized water which is free of lime, fluorine, iodine, and other impurities, normally formed in tap water, in order to minimize interference of foreign ions during the printing operation.

In addition to water and carbon black, the third critical ingredient is needed in the dispersion, namely a surfactant capable of dispersing said carbon black or pigment in said liquid disPersing medium (i.e., compatible with said carbon black and liquid dispersing medium). One or more of these is added to the dispersion in order to enhance the wetting ability and stability of the carbon black or pigment and permit maximum penetration by the particles within paper pores and fibers. Suitable dispersing agents include anionic, cationic, and nonionic surfactants (or combinations thereof). The surfactants should be soluble, stable, and preferably nonfoaming in the liquid carbon black dispersion. In general, for a polar continuous phase as in water, the surfactants should preferably have a high HLB number (8–18). Acceptable anionic surfactants include sodium or potassium salts of naphthalene sulfonic acid such as DARVAN No. 1 (R. T. Vanderbilt Co.), ECCOWET LF (Eastern Color and Chemical), PETRO AA, PETRO ULF (Petro Chemical Co., Inc.), and AEROSOL OT (American Cyanamid). Preferred anionic surfactants include neutralized phosphate ester-type surfactants such as MAPHOS 55, 56, 8135 , 60A, L6 (Mazer Chemical Co.). The most preferable anionic surfactants for a liquid carbon black dispersion are DARVAN No. 1 and MAPHOS 56 Cationic surfactants include Duoquad T-50 (Akzo Chemie America) diquaternary ammonium salt and Emcol CC-36 (Witco), Emcol CC-9 (Witco) and Cyastat SP (American Cyanamide) quaternary ammonium salts. Suitable nonionic surfactants include ethoxylated nonyl phenols such as POLY-TERGENT B-series (Olin Corporation) or alkoxylated linear alcohols such as POLY-TERGENT SL-series (Olin Corporation).

A preferred ingredient of this aqueous carbon black-containing dispersion is a mild basic material. Suitable mild bases included: organic amines, like triamines such as methyldiethanol amine or diamines such as diethanolamine which are available from Aldrich Chemical Co., Inc. Sufficient mild base should be added to the liquid carbon black dispersion in a proportion necessary to increase the pH of the resulting carbon black-containing dispersion to between about 8 and 11, preferably from about 8.5 to about 9.5. The pH of the ink is very important because, in most printheads, ink comes into contact with stainless steel parts. In such cases, the pH should be adjusted to the 8–11 range, since that range corresponds to the region of minimum corrosivity of stainless steel in aqueous fluids. However, if a plastic or nonmetal printhead is to be used, then the need for this pH adjustment is less important and not critical The amount of solid particulate matter in the dispersion should be less than about 5% by weight of the dispersion, preferably less than about 4.5% by weight. It has been found that the use of, for example, carbon black concentrations greater than 5% by weight may result in the printhead clogging. In the same regard, the solids content (i.e., all of the ingredients other than water) is preferably less than 10% by weight of the dispersion, more preferably, less than about 5.0% by weight of the total dispersion.

Following is a typical formulation of a suitable aqueous alkaline dispersion of carbon black or pigment showing the general range of suitable proportions, as well as the preferred range of proportion for the various components:

| Component | General Range | Preferred Range |
| --- | --- | --- |
| Carbon Black or Pigment | 0.1–5% by weight | 1.5–4.5% by weight |
| Surfactant | 0.01–4% | 0.05–2% |
| Mild Base | 0–1% | 0.4–0.8% |
| Water | balance | balance |

Optional ingredients may include humectants and other conventional ink-jet ink additives which may be dispersed in the presently claimed dispersion process. For instance, one problem with ink fluids having a high proportion of water is that water may evaporate during the dormancy period of the ink in the very fine ink-jet nozzles of the printer. This results in drying the ink components' precipitation and nozzle clogging.

One solution to this problem is to add a nonvolatile, miscible with water liquid, humectant to the ink. Suitable humectants are glycols, such as ethylene glycol, diethylene glycol, and polyethylene glycol (all available from Aldrich Chemical Co., Inc.) and 5,5-dimethylhydantoin formaldehyde (also known as DANTOIN) The concentration may vary from 0.1% to 55% by eight depending on printhead parameters. Another optional ingredient may include dyes in amounts up to 5%, preferably up to 3%, to influence the color and darkness of print.

After the dispersion has been made up, it is necessary to remove all aggregates larger than 5 microns from the dispersion. This aggregate removal may be carried out by either a centrifugation, filtering through a 5 micron filter or a combination of the two. Centrifugation is preferred because greater process latitude is obtained (i.e., aggregates less than 5 micron size such a 3.0-4.0 microns may also be removed easily with a centrifuge, whereas the use of 3.0-4.0 micron filter instead of a 5.0 micron filter may be impractical because of very slow filtration rates. The preferred type of centrifuge is Sorvall SS-3 made by Sorvall Instruments (DuPont Biomedical Product Division) of Wilmington, Del. Generally, it is preferred to operate this type of centrifuge at about 2,000 to 6,000 rpms for about 45 to 90 minutes.

The aqueous carbon black or pigment dispersion is typically placed in a suitable vessel and pumped or otherwise transferred to an ink-jet printhead nozzle. After the aggregate removal step, the ink-jet ink is ready for printing through an ink-jet printhead onto a receptor substrate. The receptor substrate may be plain or untreated paper.

The following examples are presented to define the invention more fully without any intention of being limited thereby. All parts and percentages are by weight unless otherwise explicitly specified.

EXAMPLE 1

An initial aqueous dispersion wad made by ball-milling deionized water (102.0 grams), an anionic surfactant (9 grams), methyl diethanolamine (9.0 grams), carbon black (30.0 grams) in a water-cooled attritor containing stone beads so that the dispersion plus beads occupied one third of the attritor volume. The water was added first. The surfactant then added, followed by the addition of methyl diethanolamine. Carbon black was added last, and the milling time was six hours. After this milling, the initial dispersion was diluted with ethylene glycol and deionized water in proportions of 1:2:3 correspondingly. The diluted dispersion was then filtered through a 5-micron filter to make the final dispersion in the proportions indicated below:

| Ingredient | % by Weight |
| --- | --- |
| Deionized Water | 61.4 |
| Anionic Surfactant 1 | 1 |
| Methyl Diethanolamine | 1 |
| Carbon Black 2 | 3.3 |
| Ethylene Glycol | 33.3 |
|  | 100.0 |

1 DARVAN No. 1 anionic surfactant produced by R. T. Vanderbilt Co. of Norwalk, CT.
2 RAVEN 3500 carbon black produced by Columbian Chemical Co. of Tulsa, OK.

The surface tension of this final dispersion was measured by means of a Fisher Surface Tensiomat (Allied Fisher Scientific) and found to be 52.8 mN/m. The pH of this filtered final dispersion was measured to be 9.2.

The viscosity of this filtered final dispersion was measured by means of Brookfield Viscometer (LVP) and found to be 3.0 mNS/m$^2$. The mean particle diameter as measured on a NiComp Model 270 Submicron Particle Sizer was 0.190% microns.

EXAMPLE 2

An initial aqueous dispersion was made by ball-milling deionized water (102.0 grams), a cationic surfactant (9.0 grams), methyl diethanolamine (0.45 grams), carbon black (30.0 grams) in a jar containing stone beads so that the dispersion plus beads occupied one third of the jar volume. The water was added first. The surfactant then added, followed by the addition of methyl diethanolamine. Carbon black was added last, and the milling time was three hours. After this milling, the initial dispersion was diluted with ethylene glycol and deionized water in a proportion of 1:2.5:2 correspondingly. The diluted dispersion was then filtered through a 5-micron filter to make the final dispersion in the proportions indicated below:

| Ingredient | % by Weight |
| --- | --- |
| Deionized Water | 50.25 |
| Cationic Surfactant 3 | 1.1 |
| Methyl Diethanolamine | .05 |
| Carbon Black 2 | 3.6 |
| Ethylene Glycol | 45.0 |
|  | 100.00 |

2 RAVEN 3500 carbon black produced by Columbian Chemical Co. of Tulsa, OK.
3 DUOQUAD T-50 cationic surfactant produced by Akzo Chemie America of McCook, IL.

The surface tension of this final dispersion was measured by means of Fisher Surface Tensiomat and found to be 45.3 mN/m.

The pH of this filtered final dispersion was measured to be 5.63. The viscosity of this filtered final dispersion was measured by means of Brookfield Viscometer LVP and found to be 4.36 mNS/m$^2$.

The mean particle diameter, as measured on a NiComp Model 270 Submicron Particle Sizer was 0.13 microns.

EXAMPLE 3

An initial aqueous dispersion was made by ball-milling deionized water (102.0 grams), an anionic surfactant (9 grams), methyl diethanolamine (9.0 grams), and carbon black (30.0 grams) in a water-cooled attritor for 20 hours in the same manner as Example 1 above. Then the dispersion was diluted 1:3 by adding more dionized water (72.0 grams of deionized water was added to 24.0 grams of dispersion). The diluted dispersion was centrifuged at 5,000 rpm for one hour, then the supernatant was separated from a small amount of residue. Diethylene glycol (5.0 grams) was added to the supernatant (95.0 grams), and mixed by stirring for one minute. The resulting mixture was filtered through a 5 micron filter. The approximate percentages of each ingredient in the filtered final dispersion were as follows:

| Ingredient | % by Weight |
|---|---|
| Deionized Water | 87.4 |
| Anionic Surfactant 1 | 1.43 |
| Methyl Diethanolamine | 1.42 |
| Carbon Black 2 | 4.75 |
| Diethylene Glycol | 5.0 |
| | 100.00 |

1 DARVAN No. 1 anionic surfactant produced by R. T. Vanderbilt Co. of Norwalk, CT.
2 RAVEN 3500 carbon black produced by Columbian Chemicals Co. of Tulsa, OK.

The surface tension of this filtered final dispersion was measured by means of Fisher Surface Tensiomat and found to be 63.1 mN/m$^{-1}$.

The pH of this filtered final dispersion was determined in the same manner as the preceding Examples and found to be 9.21, and the viscosity and mean particles diameter were also measured as before and found to be 1.54 mNS/m$^2$ and 0.083 microns, respectively.

EXAMPLE 4

An initial aqueous dispersion was made by ball-milling deionized water (68.0 grams), an anionic surfactant (6.0 grams), methyl diethanolamine (6.0 grams), and Lithol Rubin (20.0 grams) in a water-cooled attritor for six hours in the same manner as Example 1 above. Then the dispersion was diluted by adding more deionized water (to 40.0 grams fo dispersion, 200.0 grams of water was added). The diluted dispersion was centrifuged at 3,000 rpm for one hour during which time the supernatant was separated from a small amount of residue. Diethylene glycol (15.0 grams) was added to the supernatant (85.0 grams). The resulting mixture was filtered through a 5 micron filter. The approximate percentages of each ingredient in the filtered final dispersion (supernatant) were as follows:

| Ingredient | % by Weight |
|---|---|
| Deionized Water | 80.5 |
| Anionic Surfactant 3 | 0.85 |
| Methyl Diethanolamine | 0.85 |
| Lithol Rubin 4 | 1.8 |
| Diethylene Glycol | 15.0 |
| | 100.0 |

3 DARVAN No. 1 anionic surfactant produced by R. T. Vanderbilt of Norwalk, CT.
4 Lithol Rubin D4581 organic red pigment produced by BASF of Parsippany, NJ.

The shelf life of the ink-jet inks made in Examples 1-4 was measured by an accelerated longevity test, and each of these inks was found to be stable for over 60 days. HIAC and NiComp measurements before and after this test showed no appreciable difference in the particle size distribution in the inks.

The drying time was measured by smearing a printed sheet of paper immediately after the printing operation with the inks of Examples 1-4. It was found that all four inks had drying times of less than 10 seconds which is acceptable for almost all applications.

The Decap time was also measured for each ink. The Decap time is the maximum time that a felt pen can remain uncapped before one or more nozzles become clogged with ink. It was found that the Decap time was higher than 10 minutes which is acceptable for almost all applications.

The optical density of the black inks of Examples 1-3 were also measured and satisfied the target of 1.36. The inks of Examples 1-4 were also tested for waterfastness by submerging a paper printed with one of the dried inks into 500 ml deionized water for 5 minutes and then air drying. Waterfastness was calculated as a difference of print lightness before and after this procedure. The calculated difference for each of the dispersion inks of Examples 1-4 was less than one. In contrast, the commercially available solution inks showed a calculated difference of over 30. Accordingly, the inks of the present invention have significantly better waterfastness than commercially available solution inks.

The inks of Examples 1 and 2 were also tested for lightfastness by exposing prints having the dried ink of either Example 1 or 2 printed thereon to the equivalent one full year of office lighting. Lightfastness was calculated as a difference of print lightness before and after this procedure. The target was less than five units difference. The calculated lightfastness units for the inks of Examples 1 and 2 was less than 0.4 units, thus being acceptable.

What is claimed is:

1. A process for applying an ink-jet printing ink comprising the steps of:
   (a) preparing an aqueous Newtonian dispersion containing:
      (1) about 0.01% to about 5.0% by weight, based on the weight of the dispersion of particulate materials selected from the group consisting of an acidic or neutral carbon black and pigments, said particulate material, having an average particle size of less than about 3.0 microns in said dispersion;
      (2) an effective dispersing amount of an anionic, cationic, or nonionic surfactant which is compatible with said carbon black or pigment; and said dispersion having a surface tension of greater than 35 mN/m and a viscosity in the range of 1-10 mNS/m$^2$ and a pH of 8 to 11;
   (b) removing all aggregates larger than 5 microns; and
   (c) ink-jet printing said dispersion onto a receptor substrate.

2. The process of claim 1 wherein said preparation step is carried out by subjecting a dispersion concentrate to a mixing step comprising ball milling, colloidal milling, high-shear milling, or ultrasonic mixing followed by dilution of said dispersion concentrate with more water while agitating said dispersion from the desired dispersion concentration.

3. The process of claim 1 wherein said particulate material has an average particle diameter from about 0.01 to about 2.0 microns.

4. The process of claim 1 wherein said removing step (b) is carried out by either centrifuging out said agglomerates from said dispersion, filtering said dispersion through a 5.0 micron filter to filter out said agglomerates, or a combination of centrifuging and filtering.

5. The process of claim 1 wherein said particulate materials in said dispersion is an acidic or neutral carbon black having a pH from about 1 to about 7.5.

6. The process of claim 1 wherein said surfactant is an anionic surfactant having a HLB number from 8 to 18.

7. The process of claim 1 wherein said dispersion further contains a sufficient amount of a mild base to adjust the pH of said dispersion to about 8 to about 11.

8. The process of claim 7 wherein said mild base is selected from the group consisting of N-methyldiethanolamine, diethanolamine, and mixtures thereof.

9. The process of claim 1 wherein the amount of said particulate matter is less than 4.590 by weight of said dispersion.

10. The process of claim 1 wherein the said dispersion further contains a humectant in the amount from about 0.1% to 55% by weight of said dispersion.

11. The process of claim 10 wherein said humectant is selected from the group consisting of ethylene glycol, diethylene glycol, polyethylene glycol, and 5,5-dimethylhydantoin formaldehyde or mixtures thereof.

12. The process of claim 1 wherein said dispersion comprises the following ingredients:
   (i) about 1.5% to about 4.5% by weight acidic or neutral carbon black or pigment;
   (ii) about 0.05% to about 2% by weight anionic surfactant;
   (iii) about 0.4% to about 0.8% by weight mild base; and
   (iv) the balance water.

13. The process of claim 12 wherein said dispersion further contains the following ingredient:
   (v) about 0.1% to about 55% by weight humectant.

* * * * *

UNITED STATES PATENT AND TRADEMARK OFFICE
CERTIFICATE OF CORRECTION

PATENT NO. : 4,959,661

DATED : September 25, 1990

INVENTOR(S) : Galina P. Buxton, Harshad M. Shah

It is certified that error appears in the above—identified patent and that said Letters Patent is hereby corrected as shown below:

In Column 9, Line 13 delete "4,590" and insert --4.5%--.

Signed and Sealed this

Fifth Day of May, 1992

Attest:

DOUGLAS B. COMER

*Attesting Officer*    *Acting Commissioner of Patents and Trademarks*